United States Patent [19]
Cox et al.

[11] Patent Number: 5,010,509
[45] Date of Patent: Apr. 23, 1991

[54] ACCUMULATOR FOR COMPLEX NUMBERS

[75] Inventors: Roger G. Cox; Mark A. Reber; Michael W. Yeager, all of Colorado Springs, Colo.

[73] Assignee: United Technologies Corporation, Hartford, Conn.

[21] Appl. No.: 253,817

[22] Filed: Oct. 5, 1988

[51] Int. Cl.⁵ ............................ G06F 7/38; G06F 7/50
[52] U.S. Cl. .................................. 364/748; 364/784; 364/736
[58] Field of Search ............... 364/748, 736, 768, 784, 364/786

[56] References Cited

U.S. PATENT DOCUMENTS

| | | | |
|---|---|---|---|
| 4,229,802 | 10/1980 | Eggermont | 364/786 |
| 4,752,905 | 6/1988 | Nakagawa et al. | 364/784 X |
| 4,800,517 | 1/1989 | Asghar et al. | 364/757 |

OTHER PUBLICATIONS

The Plessey Company, plc 1987, Publication No. P.S. 2140, Mar. 1987.

Primary Examiner—Dale M. Shaw
Assistant Examiner—Tan V. Mai

[57] ABSTRACT

An intermediate storage register is added to the combinational logic of an accumulator and is located so that a second term may be stored in the first half of an adder array, while a first term continues the accumulation process in the second half of the array.

3 Claims, 1 Drawing Sheet

ACCUMULATOR FOR COMPLEX NUMBERS

DESCRIPTION

1. Technical Field

The field of the invention is that of integrated circuit data processing, in particular, of accumulators.

2. Background Art

The accumulator is a standard module used in data processing. Conventional accumulators require that each bit be added sequentially from lowest order to highest order, with the carry bits rippling through. Accordingly, new data cannot be entered into the accumulator until the previous data has been read out, even though most of the circuits inside the accumulator will be idle at any one time. A conventional accumulator designed for the addition of complex numbers is that of the Plessey PDSP16316 which uses two separate accumulators, one for the real portion and one for the imaginary portion of a complex number. This prior art device has an obvious duplication of silicon area.

DISCLOSURE OF INVENTION

The invention relates to an improved accumulator having an intermediate storage area for storing the data that is passed through half of the adder array, thus permitting the loading of new data into the beginning circuits of the accumulator after the previous data has passed through only half of the arrays.

A feature of the invention is the addition of an intermediate storage register for storing the output of the accumulator from a previous cycle together with a multiplexer that permits data to be loaded from either the input lines or from the temporary register.

Another feature of the invention is a mode of operation and hardware which permits the accumulator to process real numbers on even clock cycles and imaginary numbers on odd clock cycles, thus sharing hardware.

Another feature of the invention is that of a mode of operation in which two partial sums of numbers are circulating within the accumulator, the sums being combined at the end of the process to give a final result.

Other features and advantages will be apparent from the specification and claims and from the accompanying drawings which illustrate an embodiment of the invention.

BEST MODE FOR CARRYING OUT THE INVENTION

Figure 1:
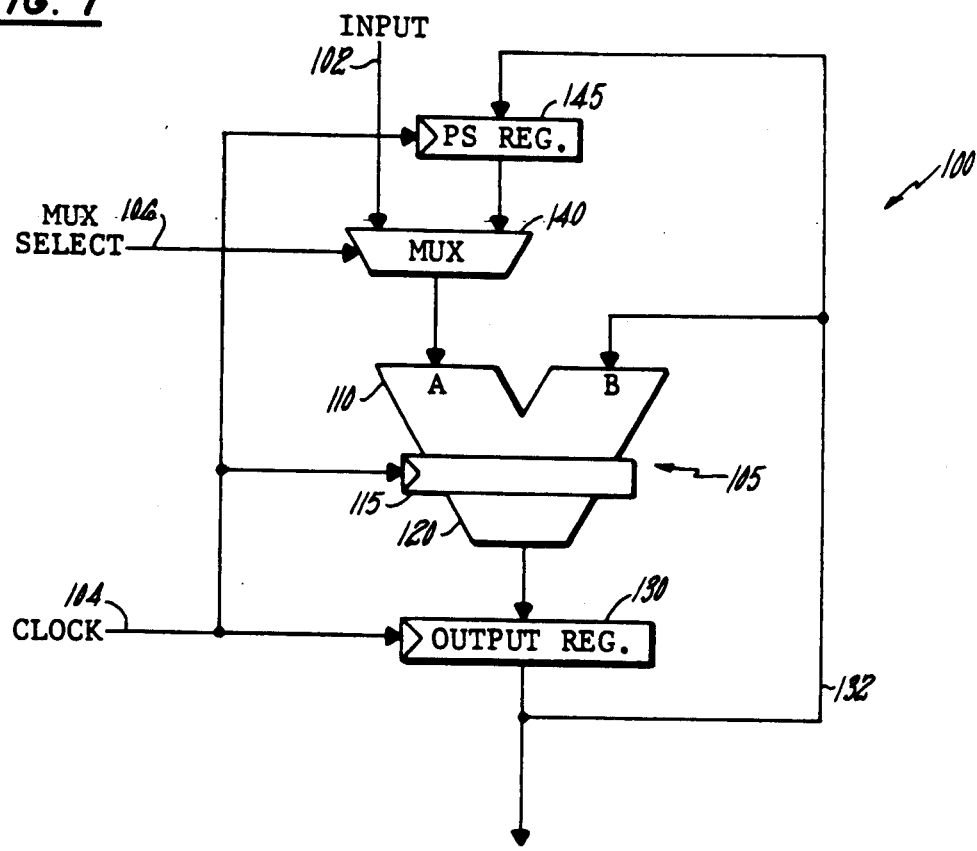
FIG. 1 illustrates in block diagram form an accumulator according to the invention.

FIG. 1 illustrates schematically an accumulator circuit according to the invention denoted generally by the numeral 100. The central portion of the accumulator is the adder denoted by the numeral 105. This accumulator is modified by the addition of an intermediate register 115 dividing an upper portion 110 and a lower portion 120 of the combinational logic sections of the adder. Adder 105 has a conventional output register 130, the output of which may be directed to the outside world or fed back into the input, and conventional input ports A and B. A modified input portion includes a multiplexer 140, which directs to input A of the adder either input data on lines 102 or the contents of a partial sum register 145 that is connected to the output register 130. Data in register 130 is simultaneously on line 132 connecting register 130 to register 145 and to port B. Register 145 will not reflect the data until it is clocked in. Input ports A and B may simply be terminals or may be storage devices such as latches or registers, as is convenient. A multiplex selector control signal travels along line 106 to control the operation of the multiplexer from its normal state in which input data on bus 102 is fed into input A to the alternate state in which the contents of partial sum register 145 are fed into input A.

Figure 2:
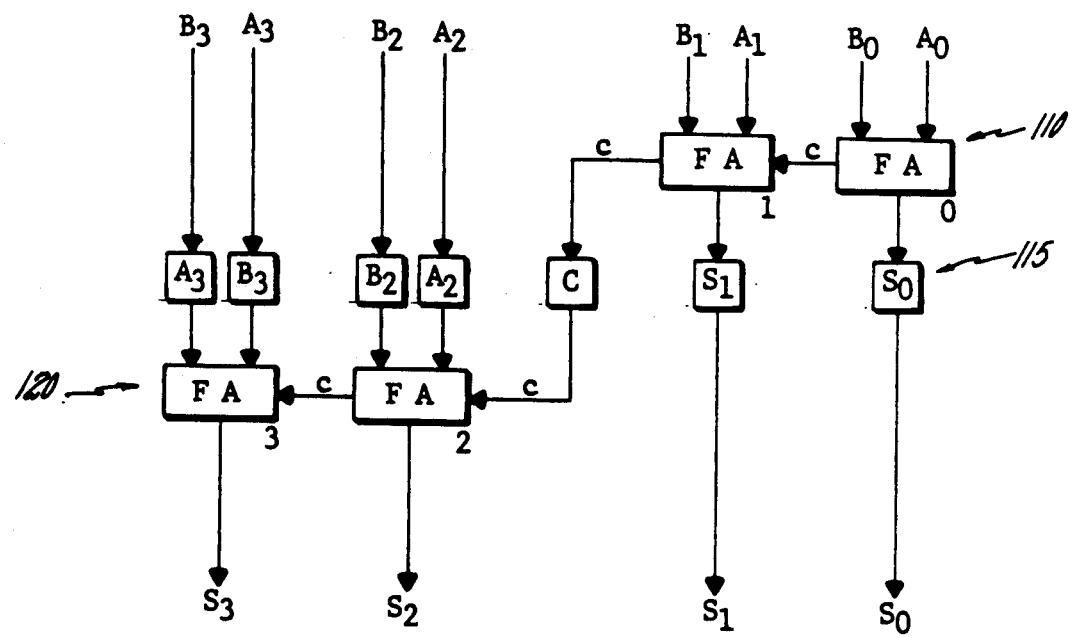
FIG. 2 illustrates in greater detail an embodiment of the invention.

Referring now to FIG. 2, there is shown in more detail a 4-bit example of an accumulator constructed according to the invention. At the top of the Figure, there are four lines representing the bits of numbers A and B to be added together in this example. The first low order bits enter full adders $FA_0$ and $FA_1$. These full adders are conventional in the industry and are not illustrated in detail. The output of each full adder, which is the sum of the corresponding two bits, passes to an intermediate register containing modules $S_0$ and $S_1$ respectively. A carry bit from full adder $FA_1$ is also stored in the register block labeled C. The input data for bits $B_2$ and $A_2$ and $B_3$ and $A_3$ is transmitted directly to corresponding register units where the data is stored awaiting the correct time to be combined with the carry bit and added.

In operation, data passes through the first two adders in the first "half-cycle" which is referred to as a half cycle because it lasts for half the conventional time for data to pass through the adder. After full adder $FA_1$ has finished and generated a carry bit, the first two low order bits plus the carry bit are stored in register 115, together with the input data. Once the data has been clocked into register 115, the input circuits in section 110 are ready to receive a new set of data. On the second half-cycle, intermediate terms $S_0$ and $S_1$ are passed to the output and the remaining high-order bits in the sum are added in section 120. At the end of the second half-cycle, all four bits $S_0$-$S_3$ are stored in the output register 130 and the second set of intermediate data is clocked into register 115.

Those skilled in the art will readily appreciate that there are two sums passing through the adder on any half cycle. When the nth term is present in the output register, an intermediate form of the n+1th term is in register 115. These contents of this register are referred to as an intermediate form because there are not the sum nor are they the raw data, but rather they are the low order bits of the sum together with the data required to add the high order bits.

The accumulator was designed with an eye to performing complex arithmetic, an example of which is illustrated in table 1 in which the sum of three complex numbers is to be formed. In the first column of the table the cycle number is listed. The second column illustrates the contents of the input register; the third column illustrates the contents of the intermediate registers and the fourth column illustrates the contents of the output registers. On the nth cycle, the A register has $R_1$, the first real component, and the other registers have undefined data. On the n+1th cycle, the input has been transferred unchanged to the intermediate register because the output register, which is the input to port B, initially has zeros stored in it, and the A register has the first term in the imaginary sum, $I_1$. On the n+2nd cycle, the input A has $R_2$; the intermediate register has $I_1$ and the first term in the real sequence, $R_1$, has reached the output register. On the n+3rd term, the input register has $I_2$, the second term in the imaginary sequence, the intermediate register now has data referred to R' which indicates an intermediate set of data in the real sequence that is not $R_1$ nor $R_2$ nor the sum of $R_1+R_2$, but the sum the of the low order bits together with the raw data for the high order bits and the output register has $I_1$. On the n+4th term, register A contains $R_3$, the intermediate register 115 contains a corresponding intermediate term in the imaginary sequence and the output register has the sum of the first two terms in the real sequence, $R_1+R_2$. On the n+5th cycle, the last term in the imaginary sequence is present in register A, the intermediate register contains an intermediate term in the real sequence and the output register contains the first two terms in the imaginary sequence. In the n+6th and n+7th cycles, the contents of register A are not defined, since in these cycles the data is being worked through to produce the required final result in the output register. On the n+6th cycle, the real sum appears in the output register and on the n+7th cycle, the imaginary sum appears.

In the prior art Plessey device, the same result of real and imaginary terms would be produced by the use of two accumulators, each of which passes through its data continuously without the use of an intermediate register. Thus, the time for each term to pass through the adder is the same as that in this example, but each adder carries only one term at a time so that the present invention uses the adder hardware twice as efficiently. In this example, the partial sum register 145 was not used and multiplexer 140 remained switched to pass data from line 102 into register A at all times. The feedback loop for the accumulation process was provided by direct transfer from output register 130 to the second input B of the adder 105.

An example in which partial sum register 145 is used is illustrated in table 2, in which a sequence of numbers is to be added (either all real or all imaginary). The left column illustrates the cycle as before. The second column illustrates the value of the A input, the third column illustrates the value of the B input, the fourth column illustrates the contents of the intermediate register 115, the fifth column illustrates the contents of the output register and the sixth column illustrates the contents of partial sum register 145. The first four cycles are similar to that of table 1. A first number $I_0$ is applied to input A, passes through the intermediate register to the output register and loops back in to input B on the n+3rd cycle. Similarly, the first term in the second sequence $I_1$ passes through one cycle behind the first term. On the n+3rd cycle, input A contains $I_3$, the second term in the odd sequence and the intermediate register contains the partial term as discussed before in the even sequence. On the n+4th cycle, the partial sum $I_0+I_2$ appears on the output register and the intermediate register 115 contains the intermediate term on the odd sequence. On the n+5th cycle, the second term on the odd sequence appears on the output. On the N+6th cycle, the sum of the three even terms appears on the output and will be transferred to the partial sum register 145 on the next cycle. On the n+7th cycle, the contents of the partial sum register 145 are loaded and transferred to input A through multiplexer 140 and the sum of the three odd terms appears at input B as is the usual case. The inputs in A and B are now the even and odd sum terms which are propagated through as a conventional adder to result in the output being the complete sum on the n+9th cycle. The partial sum register is only used once in this sequence to store the even partial sum temporarily until the odd partial sum has been computed. The partial sum register will have controlling means to allow the output data to be entered two cycles before the complete sum is desired.

Those skilled in the art will readily be able to make modifications of the invention in light of the disclosure. In particular, variations are possible for the intermediate register 115. It has been illustrated as having storage spaces for the partial low order partial sums, the carry bit and the raw data for the high bits. Other versions would be one in which the full adders for bits 2 and 3 contain latches so that the raw data may be stored within the full adder and the high order spaces in the register 115 could be eliminated. Similarly, the outputs from full adders zero and 1 could pass directly to the output register and be latched there, so that the low order spaces in register 115 could be eliminated. The term "intermediate register" thus should be taken to mean a means for storing the intermediate data, whether as a full set of storage spaces or a combination of special storage areas together with dual-use storage areas, such as a latch on a full adder.

The example illustrated was chosen for ease in explanation and the invention may be applied to other versions of the carry scheme, such as a look ahead carry or carry select. The invention has also been applied to floating point arithmetic, as illustrated in copending U.S. patent application Ser. No. 253,826, In that case, the first portion of the adder compares exponents and normalizes the two inputs, while the second half of the adder adds the mantissas of the normalized numbers, performs the rounding operation and detects overflow and underflow conditions. Hardware to accomplish these latter functions are conventional, such as illustrated in Section 3.2 of the book "Introduction to Arithmetic for Digital Systems, Designers" by Shlomo Wasser and Michael J. Flynn (Holt, Rinehart and Wirston publishers) 1982.

It should be understood that the invention is not limited to the particular embodiments shown and described herein, but that various changes and modifications may be made without departing from the spirit and scope of this novel concept as defined by the following claims.

TABLE 1

| CYCLE | INPUT | INTERMEDIATE | OUTPUT |
|---|---|---|---|
| n | R1 | — | — |
| n + 1 | I1 | R1 | — |
| n + 2 | R2 | I1 | R1 |
| n + 3 | I2 | R1 | I1 |
| n + 4 | R3 | I1 | R1 + R2 |
| n + 5 | I3 | R1 | I1 + I2 |
| n + 6 | — | I1 | R1 + R2 + R3 |
| n + 7 | — | — | I1 + I2 + I3 |

TABLE 2

| CYCLE | A | B | INTERMEDIATE | OUTPUT | PS |
|---|---|---|---|---|---|
| n | I0 | — | — | — | — |
| n + 1 | I1 | — | I0 | — | — |

TABLE 2-continued

| CYCLE | A | B | INTERMEDIATE | OUTPUT | PS |
|---|---|---|---|---|---|
| n + 2 | I2 | I0 | I1 | I0 | — |
| n + 3 | I3 | I1 | EVEN1 | I1 | — |
| n + 4 | I4 | I0 + I2 | ODD1 | I0 + I2 | — |
| n + 5 | I5 | I1 + I3 | EVEN1 | I1 + I3 | — |
| n + 6 | — | EVEN | ODD1 | I0 + I2 + I4 = EVEN | EVEN |
| n + 7 | EVEN | ODD | — | I1 + I3 + I5 = ODD | — |
| n + 8 | — | — | — | — | — |
| n + 9 | — | — | — | EVEN + ODD | — |

We claim:

1. An integrated circuit accumulator comprising an adder having first and second input ports, combinational logic means having a set of adder modules for adding first and second input numbers presented to said input ports to form a sum, and an output register means for transferring said sum to said second input port for further addition, said combination logic means being connected between said first and second ports and said output register means characterized in that:

said combinational logic means includes therein first and second portions of combinational logic means and an intermediate storage means connected therebetween, intermediate storage means for storing intermediate data comprising an intermediate form of a partially completed addition operation and having a sum portion containing at least one sum register for storing at least one low order sum bit representing a sum of corresponding low order bits of said first and second numbers, a carry portion for storing a carry bit from the highest one of said at least one sum register and further having a data portion containing at least one pair of data registers for storing high order pairs of bits of said first and second numbers, whereby said adder is divided into said first portion before said intermediate register and said second portion after said register; and means for loading a third input number into said first input port and means for transferring a fourth input number from said output register means into said second input port when said intermediate data is in said intermediate storage means, whereby said second portion of said adder performs steps in the addition of said first and second numbers and said first portion of said after performs steps in the addition of said third and fourth numbers simultaneously.

2. An accumulator according to claim 1, further characterized in that a temporary storage register is connected between said means for transferring said sum to said second input port and a multiplexer connected to transfer input data either from an input source or from said temporary storage register to said first input port, whereby a partial sum term may be controllably transferred from an output of said adder to said first input port and then added to the next number appearing on said output register.

3. An accumulator according to claim 1, further characterized in that said first portion contains means for operating on the exponents of floating point numbers and said second portion contains means for operating on the mantissas of floating point numbers.

* * * * *